United States Patent
Lee

(10) Patent No.: US 11,478,824 B2
(45) Date of Patent: Oct. 25, 2022

(54) SPECIFIC GRAVITY-SPECIFIC WASTE AIR SORTER HAVING IMPURITY SEPARATION FUNCTION, USING VORTEX

(71) Applicant: DAWON INDUSTRY CO., LTD, Siheung-si (KR)

(72) Inventor: Jaeman Lee, Bucheon-si (KR)

(73) Assignee: DAWON INDUSTRY CO., LTD, Siheung-si (KR)

( * ) Notice: Subject to any disclaimer, the term of this patent is extended or adjusted under 35 U.S.C. 154(b) by 0 days.

(21) Appl. No.: 17/418,708

(22) PCT Filed: Jan. 23, 2020

(86) PCT No.: PCT/KR2020/001191
§ 371 (c)(1),
(2) Date: Jun. 25, 2021

(87) PCT Pub. No.: WO2020/166847
PCT Pub. Date: Aug. 20, 2020

(65) Prior Publication Data
US 2022/0080463 A1    Mar. 17, 2022

(30) Foreign Application Priority Data

Feb. 14, 2019   (KR) .................. 10-2019-0017033

(51) Int. Cl.
*B07B 7/083* (2006.01)
*B07B 7/01* (2006.01)
(Continued)

(52) U.S. Cl.
CPC ............... *B07B 7/083* (2013.01); *B07B 7/01* (2013.01)

(58) Field of Classification Search
CPC .. B07B 7/083; B07B 7/01; B07B 4/02; B07B 4/08; B07B 9/00; B07B 9/02;
(Continued)

(56) References Cited

U.S. PATENT DOCUMENTS

| 5,024,335 A | * | 6/1991 | Lundell | B07B 13/072 |
| | | | | 209/629 |
| 8,720,698 B2 | * | 5/2014 | Petitpas | B07B 13/07 |
| | | | | 209/673 |
| 2006/0180522 A1 | * | 8/2006 | Legtenberg | B07B 4/02 |
| | | | | 209/640 |

FOREIGN PATENT DOCUMENTS

| CN | 108554806 A | * | 9/2018 |
| JP | H06-343926 A | | 12/1994 |

(Continued)

OTHER PUBLICATIONS

KR Office Action dated Apr. 24, 2019 as received in Application No. 10-2019-0017033.
(Continued)

*Primary Examiner* — Gene O Crawford
*Assistant Examiner* — Muhammad Awais
(74) *Attorney, Agent, or Firm* — Maschoff Brennan

(57) ABSTRACT

A specific gravity-specific waste air sorter separates impurities using a vortex for sorting waste into high-specific gravity materials, low-specific gravity materials, and impurities when the impurities are shaken off and removed by means of the hitting of a rotating drum and vanes while the waste fed therein is turned over by a vortex. A main drum has radial vanes, an upper auxiliary drum, and a lower auxiliary drum. The main drum is provided at one side of an input hole, the upper auxiliary drum is provided at the other side of the input hole, and the lower auxiliary drum is provided below the upper auxiliary drum. The main drum and the lower auxiliary drum rotate in the same direction, whereas the upper auxiliary drum rotates in the opposite direction. A vortex is formed between the main drum, the upper auxiliary drum, and the lower auxiliary drum.

12 Claims, 10 Drawing Sheets

(51) Int. Cl.
　　　*B07B 4/02*　　　(2006.01)
　　　*B07B 4/08*　　　(2006.01)
(58) Field of Classification Search
　　　CPC ....... B07B 13/003; B07B 13/11; B07B 13/08;
　　　　　　　B07B 1/42; B07B 13/14; B07B 2220/00;
　　　　　　　　　　　　　　　　　　　B01B 2220/02
　　　USPC .......................................................... 209/19
　　　See application file for complete search history.

(56) References Cited

FOREIGN PATENT DOCUMENTS

| | | | | |
|---|---|---|---|---|
| JP | 2001-327927 | A | | 11/2001 |
| JP | 2001327927 | A | * | 11/2001 |
| JP | 2010-207697 | A | | 9/2010 |
| JP | 2010207697 | A | * | 9/2010 |
| KR | 10-2011-0130557 | A | | 12/2011 |
| KR | 20110130557 | A | * | 12/2011 |
| KR | 10-1878387 | B1 | | 7/2018 |
| KR | 10-1883621 | B1 | | 7/2018 |
| KR | 101878387 | B1 | * | 7/2018 |
| KR | 101883621 | B1 | * | 7/2018 |
| KR | 10-1931687 | B1 | | 12/2018 |
| KR | 101931687 | B1 | * | 12/2018 |
| KR | 10-2012279 | B1 | | 8/2019 |

OTHER PUBLICATIONS

KR Decision to Grant dated Aug. 8, 2019 as received in Application No. 10-2019-0017033.

\* cited by examiner

SPECIFIC GRAVITY-SPECIFIC WASTE AIR SORTER HAVING IMPURITY SEPARATION FUNCTION, USING VORTEX

TECHNICAL FIELD

The present disclosure relates to a waste sorter using specific gravity, and more particularly, to a specific gravity-specific waste air sorter having an impurity separation function using a vortex for sorting waste into high-specific gravity materials (PET bottles, glass bottles, cans, metals, and the like), low-specific gravity materials (vinyl, paper, and the like), and impurities (sand, soil, dust, glass dust, and the like) when the impurities are shaken off and removed by hitting the input waste using rotary drums and vanes while the waste is overturned by a vortex.

BACKGROUND ART

In general, a waste sorter classifies various wastes generated in industrial sites and other sites, and recyclable waste is recycled through a reprocessing procedure. As such, a sorter is used to separate wastes by type.

As disclosed in Korean Patent No. 10-1931687, a conventional sorter includes: a case including an inlet formed at an upper front side thereof to introduce waste, an impurity discharger formed in a lower central portion, and a low-specific gravity material discharger formed in a lower rear portion; a plurality of screens arranged inside the case and inclined in a longitudinal direction, each of the screens including a plurality of impurity discharge holes; crankshafts respectively disposed at lower front and rear sides of the case and configured to alternately move the plurality of screens up and down to cross each other; and a motor configured to drive the crankshafts, wherein an introduction guide is disposed at a lower front side of the inlet to rotate on an axis thereof, angle adjuster plates having a plurality of holes formed therein are bolted to opposite sides of the introduction guide, fixing plates are arranged at opposite sides of the front side of the introduction guide and are bolted to any one of the holes of the angle adjuster plates, an impurity discharge hole formed in a central portion of the screen towards a separation guide has a size allowing fine impurities to be discharged therethrough, and an impurity discharge hole formed in the central portion of the screen towards the separation guide has a size allowing thick impurities to be discharged therethrough, wherein the separation guide is disposed at a central portion of the impurity discharger.

Although the sorter configured as above is capable of separating waste according to a weight thereof, the sorter is not capable of shaking off impurities stuck to waste, and accordingly, a separate removal process is required and the number of processes increases. As a result, a huge and expensive machine is necessary. Further, in the case of a screen conveyer having a vibrator function, the screen conveyer undergoes wear and generates noise due to vibration, and waste can be sorted only when the screen is long.

DISCLOSURE

Technical Problem

Therefore, the present disclosure has been made in view of the above problems, and it is one object of the present disclosure to provide a specific gravity-specific waste air sorter having an impurity separation function using a vortex for sorting waste that is dropped after impurities are shaken off and removed from the waste by hitting the waste using a rotary drum and a vane while the vortex is formed by a plurality of drums in an introduction port into which waste is introduced and is tumbled using the vortex, into high-specific gravity materials, low-specific gravity material, and impurities.

It is another object of the present disclosure to provide a specific gravity-specific waste air sorter having an impurity separation function using a vortex for separating impurities on a low-specific gravity material by causing the low-specific gravity material transported through a screen to be overturned and transported by air sprayed in a pulse form.

It is yet another object of the present disclosure to provide a specific gravity-specific waste air sorter having an impurity separation function using a vortex for preventing strings from being wound around a drum by cutting strings or impurities that may be wound around the drum.

Technical Solution

In accordance with one aspect of the present disclosure, provided is a specific gravity-specific waste air sorter having an impurity separation function using a vortex, the sorter including a main drum, an upper auxiliary drum, and a lower auxiliary drum, each having a radial vane, wherein the main drum is disposed at one side of an introduction port, the upper auxiliary drum is disposed at an opposite side of the introduction port, and the lower auxiliary drum is disposed below the upper auxiliary drum, wherein, while the main drum and the lower auxiliary drum rotate in the same direction, the upper auxiliary drum rotates in an opposite direction, and the main drum, the upper auxiliary drum, and the lower auxiliary drum rotate at different speeds to maximize the vortex formed between the main drum, the upper auxiliary drum, and the lower auxiliary drum, wherein a screen conveyer formed like a net is disposed below the introduction port to be inclined.

The lower auxiliary drum may horizontally reciprocate toward the main drum to continuously move a vortex area within a predetermined section.

Air in a pulse form that is instantly, periodically sprayed for a predetermined time may be discharged upwards from below the screen conveyer to overturn a low-specific gravity material transported along a screen conveyer to separate impurities once more.

The vane of the lower auxiliary drum may be provided with a plurality of holes formed therethrough.

A fixed cutter may be disposed on an inner wall of the introduction port, and a rotary cutter configured to closely approach the fixed cutter may be disposed on the vane of the main drum to cut a string when the string is likely to be wound around the main drum.

The main drum, the upper auxiliary drum, and the lower auxiliary drum may include a plurality of separation plates formed in a lateral direction, wherein each of the separation plates may include a plurality of protrusions formed in a trapezoidal shape on a circumference thereof, wherein the protrusions may be rounded at corners thereof, and provided with blades by sharpening distal ends of thereof.

Advantageous Effects

A specific gravity-specific waste air sorter having an impurity separation function using vortex according to the present disclosure may sort waste by weight by shaking off impurities on the waste by hitting the waste using a rotary drum and a vane while overturning the introduced waste using a vortex.

A low-specific gravity material transported through a screen conveyer may be overturned by air of a pulse form that is instantly sprayed with a periodicity for a predetermined time, and accordingly, the impurities may be separated from the low-specific gravity material once more. Thereby, the impurities may be removed to the maximum degree.

A string or impurities that are likely to be wound around a drum may be cut by a fixed cutter and a rotary cutter, and thus strings may be prevented from being wound around the drum.

BEST MODE

Hereinafter, a specific gravity-specific waste air sorter having an impurity separation function using a vortex according to the present disclosure will be described in detail with reference to the accompanying drawings.

Figure 1:
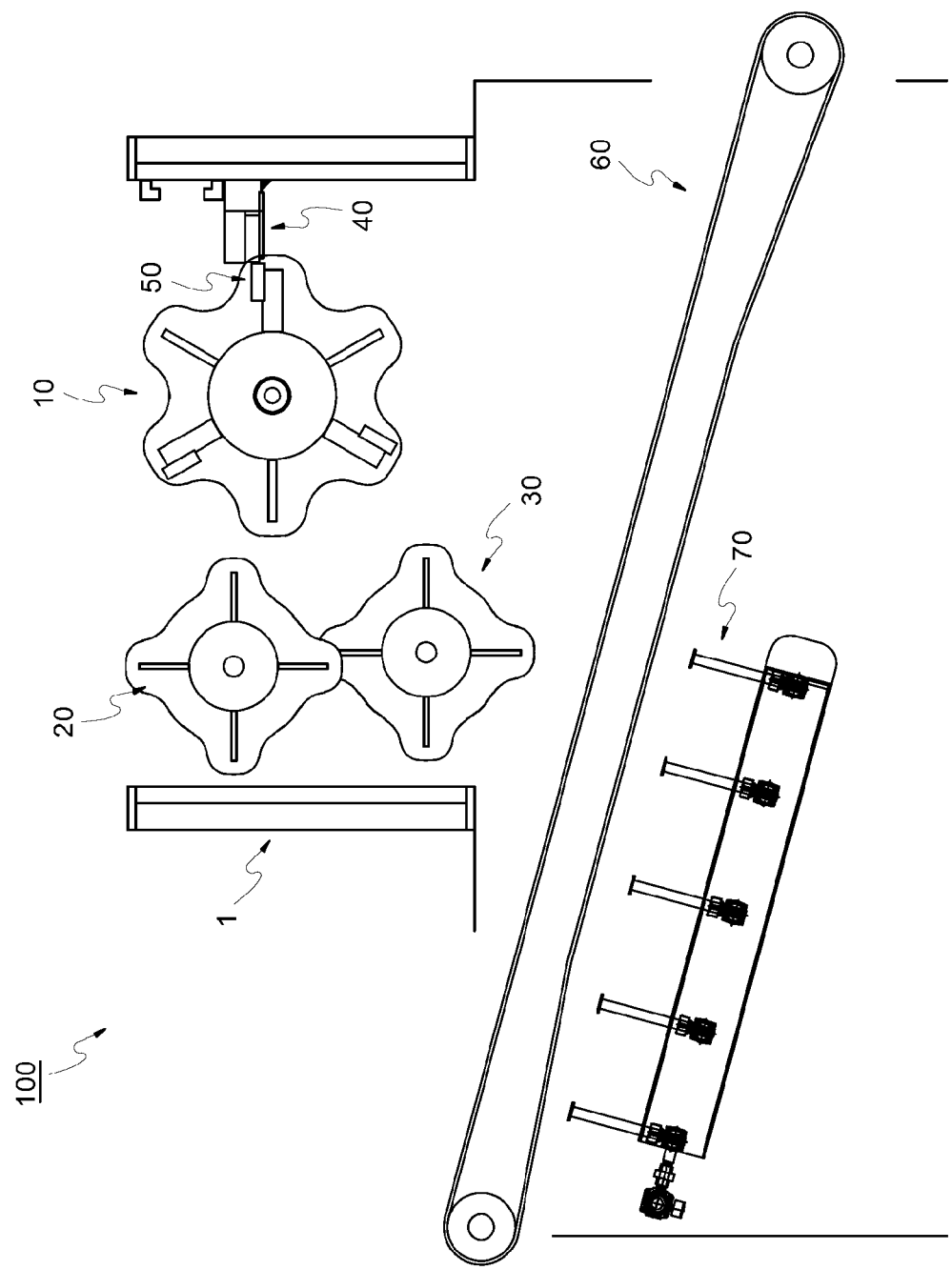
FIG. 1 is a side view showing a structure of a specific gravity-specific waste air sorter according to the present disclosure.
Figure 2:
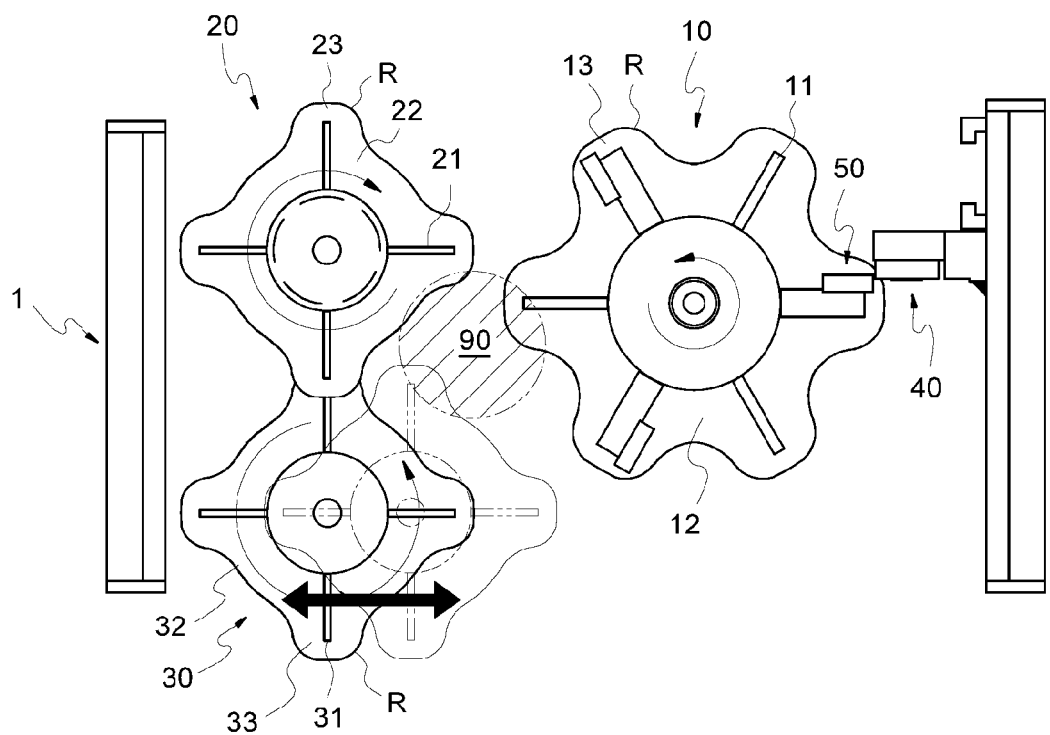
FIG. 2 is an enlarged view of main parts of the structure of the specific gravity-specific waste air sorter according to the present disclosure.
Figure 3:
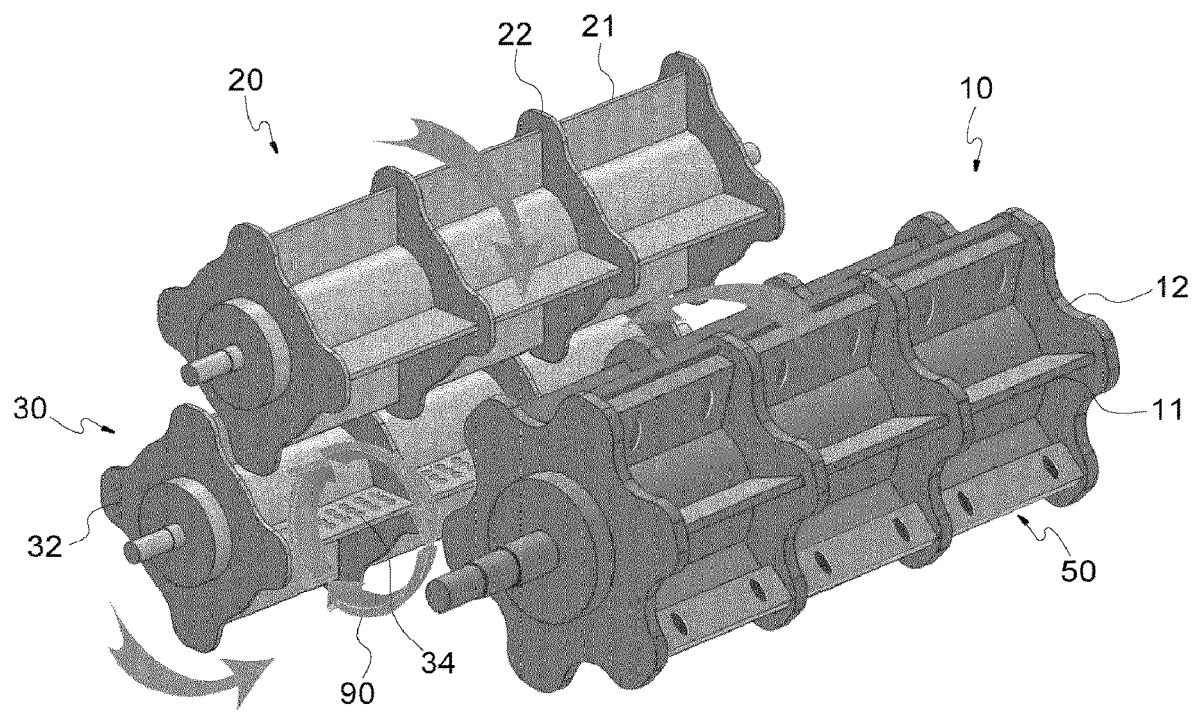
FIG. 3 is a perspective view showing a structure of a drum according to the present disclosure.
Figure 4:
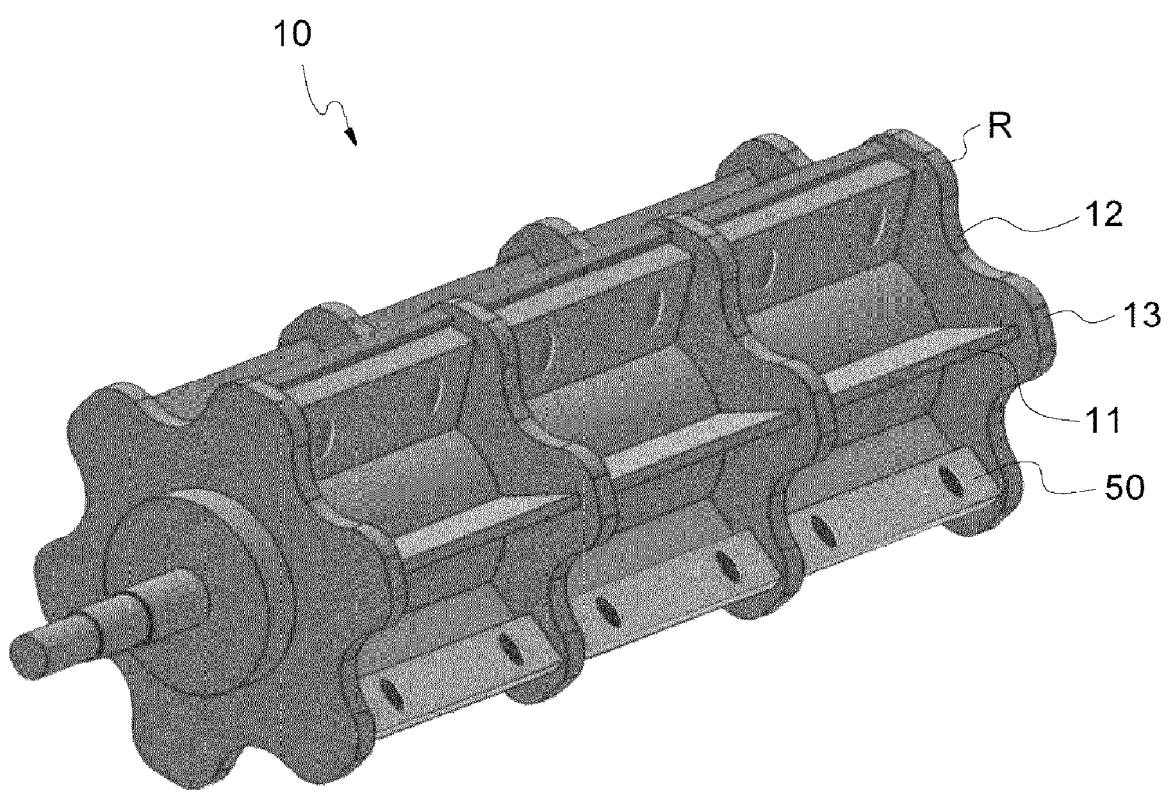
FIGS. 4 to 6 are perspective views showing structures of respective drums according to the present disclosure.
Figure 5:
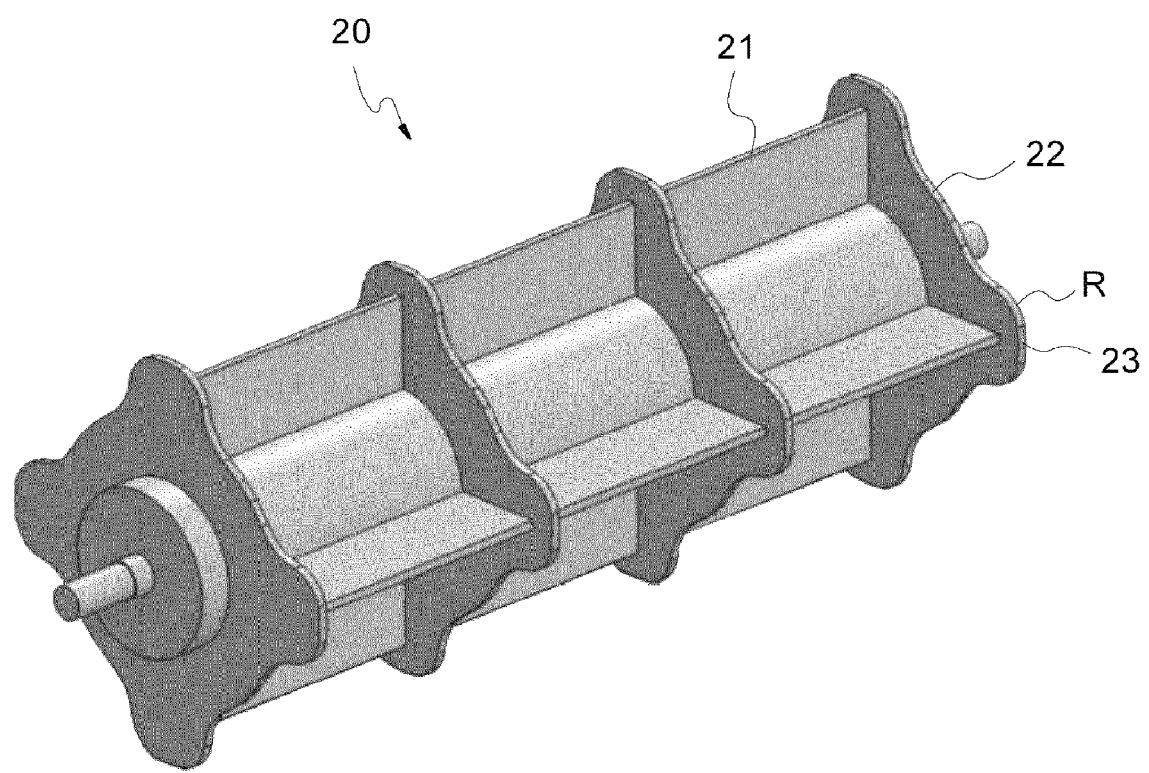
Figure 6:
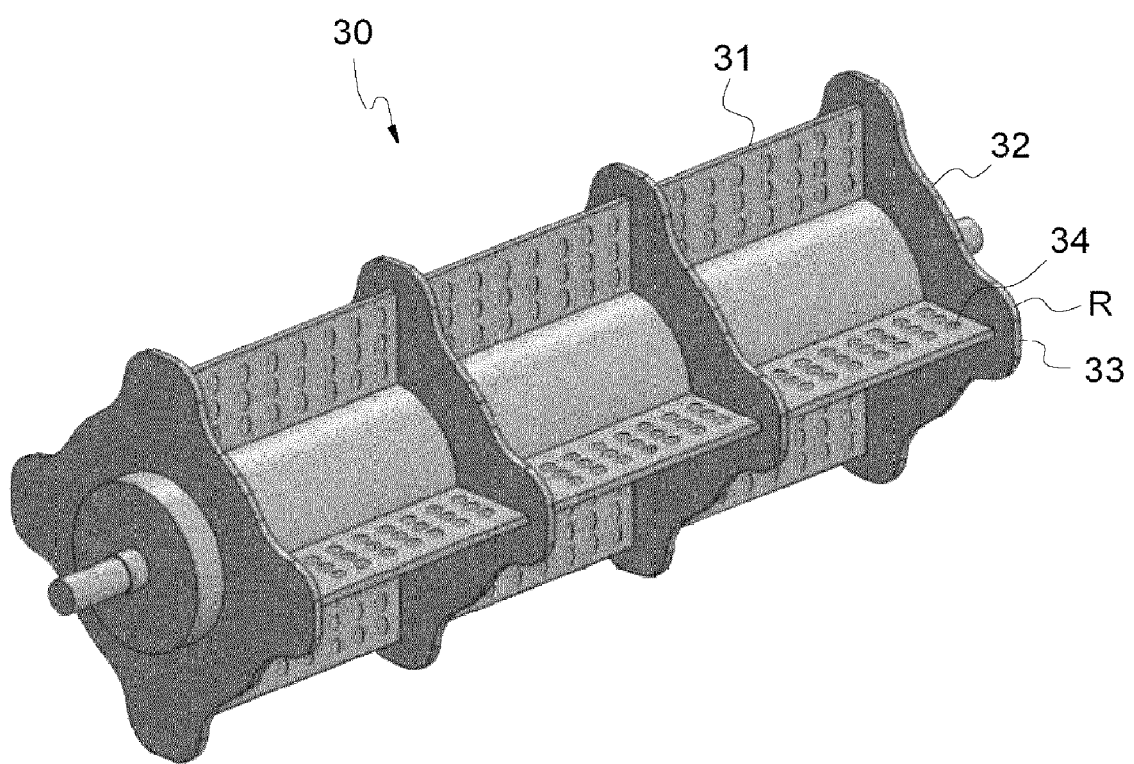
Figure 7:
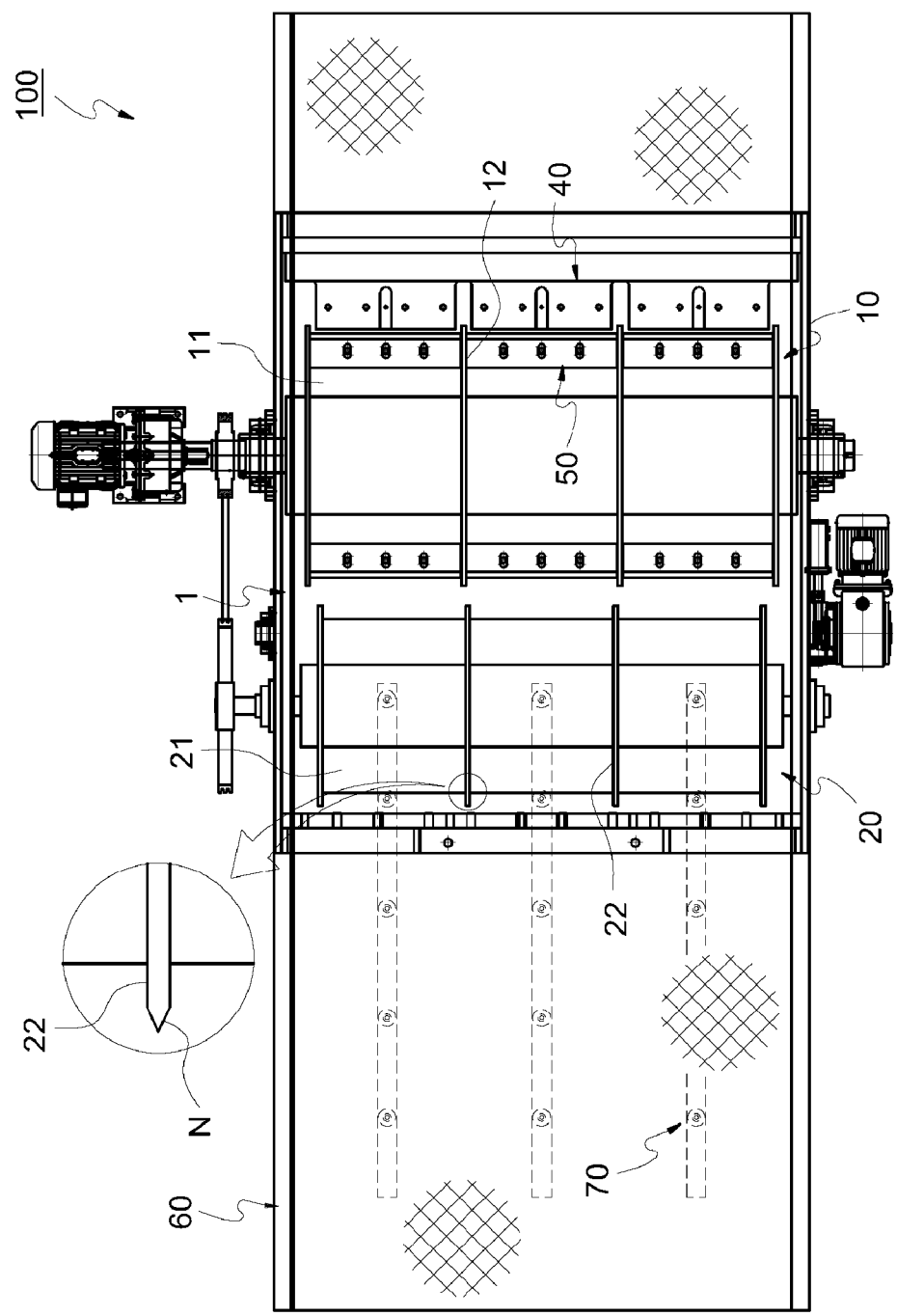
FIG. 7 is a plan view showing the structure of the specific gravity-specific waste air sorter according to the present disclosure.
Figure 8:
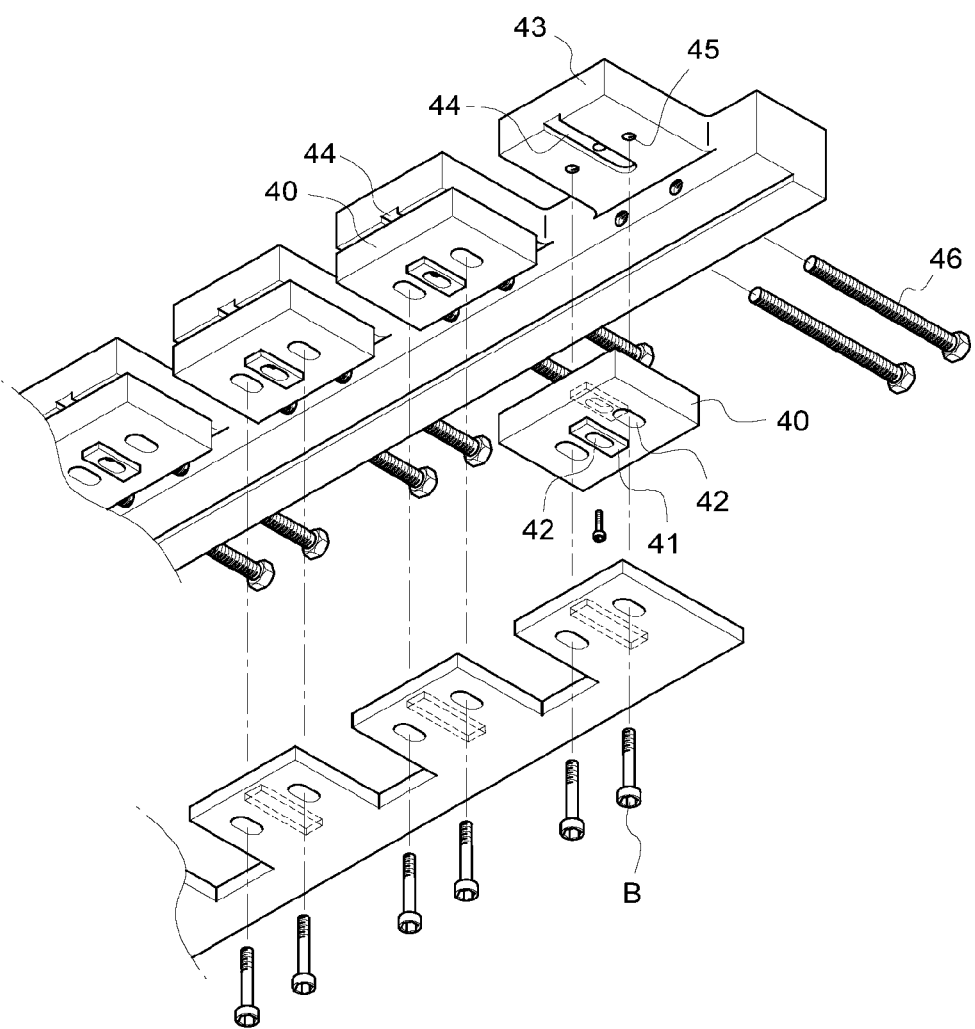
FIG. 8 is a bottom perspective view showing a structure of a fixed cutter according to the present disclosure.
Figure 9:
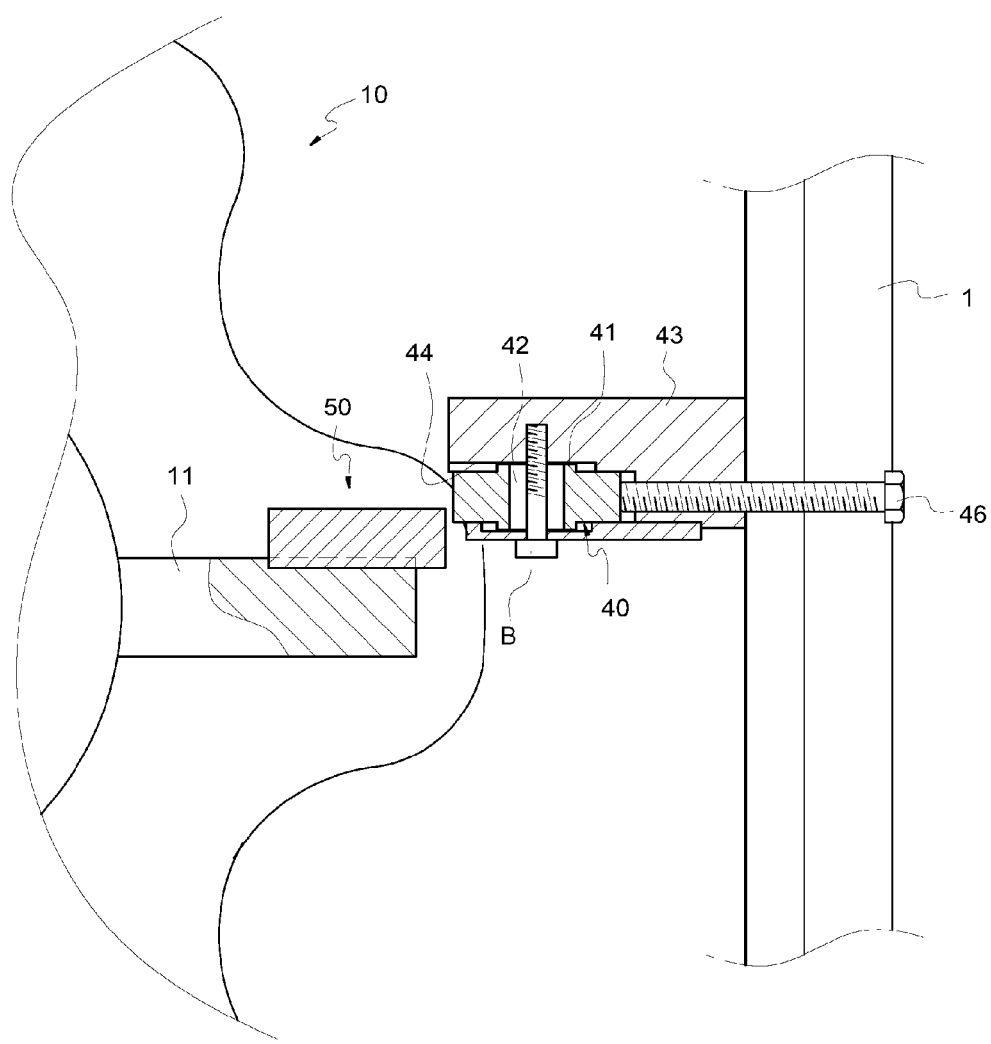
FIG. 9 is an enlarged view of main parts of structures of a fixed cutter and a rotary cutter according to the present disclosure.
Figure 10:
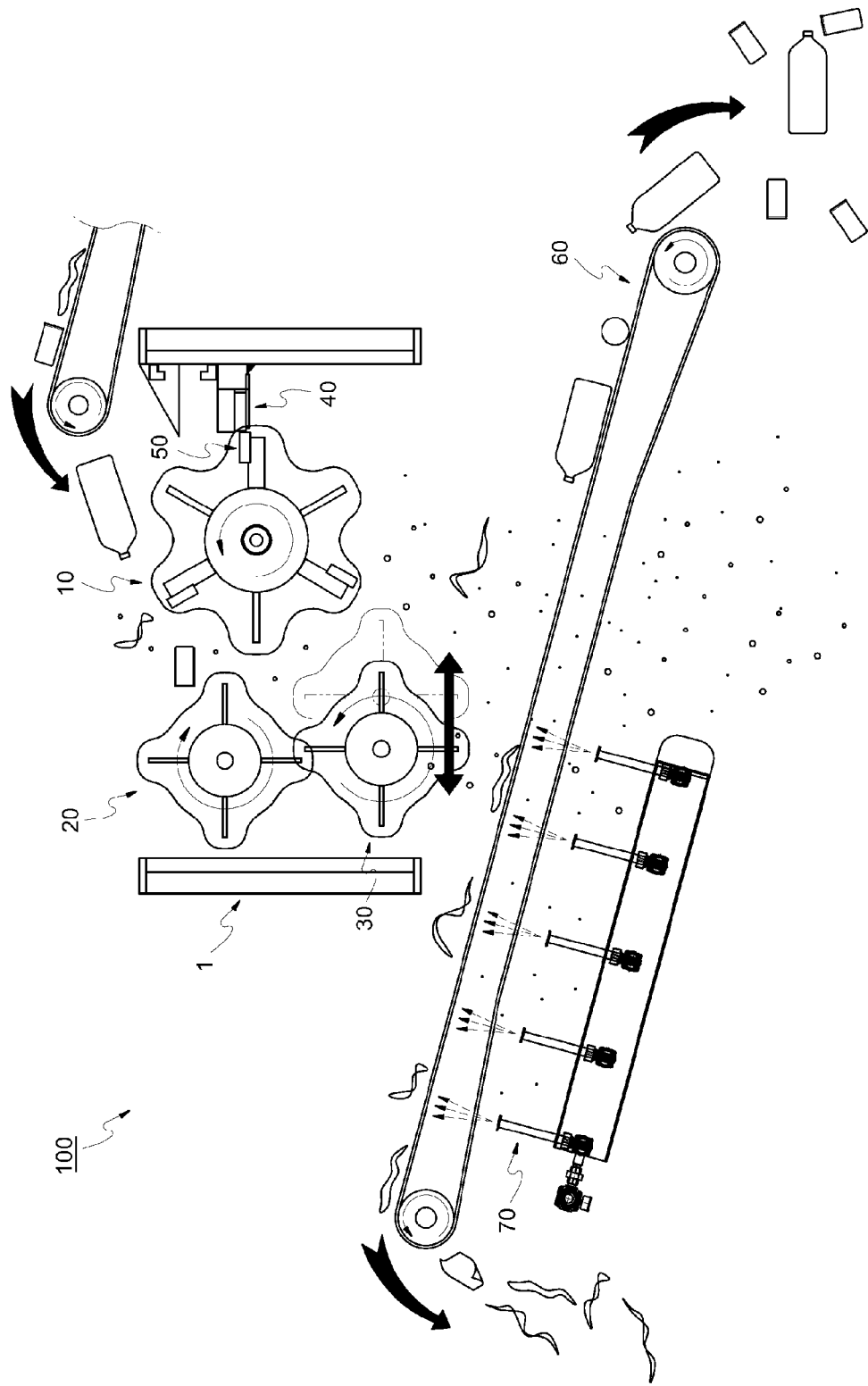
FIG. 10 is a state diagram showing an operation state of the specific gravity-specific waste air sorter according to the present disclosure.

FIG. 1 is a side view showing a structure of a specific gravity-specific waste air sorter according to the present disclosure. FIG. 2 is an enlarged view of main parts of the structure of the specific gravity-specific waste air sorter. FIG. 3 is a perspective view showing a structure of a drum. FIGS. 4 to 6 are perspective views showing structures of respective drums. FIG. 7 is a plan view showing the structure of the specific gravity-specific waste air sorter. FIG. 8 is a bottom perspective view showing a structure of a fixed cutter. FIG. 9 is an enlarged view of main parts of structures of a fixed cutter and a rotary cutter. FIG. 10 is a state diagram showing an operation state of the specific gravity-specific waste air sorter.

As shown in the drawings, a specific gravity-specific waste air sorter 100 having an impurity separation function using a vortex according to the present disclosure includes a main drum 10, an upper auxiliary drum 20, and a lower auxiliary drum 30, which create a vortex, and includes a screen conveyer 50 disposed there below so as to be inclined.

Each of the main drum 10, the upper auxiliary drum 20, and the lower auxiliary drum 30 has a cylindrical shape, includes a radial vane 11, 21, 31 formed on a circumference thereof, and includes a plurality of separation plates 12, 22, 32 formed in a lateral direction.

The main drum 10 may be disposed at one side of an introduction port 1. The upper auxiliary drum 20 may be disposed at the opposite side of the introduction port 1 to face the main drum 10 and be positioned at a slightly higher level than the main drum 10. The lower auxiliary drum 30 may be disposed below the upper auxiliary drum 20. The main drum 10 may be larger in size than the upper auxiliary drum 20 and the lower auxiliary drum 30, and the upper auxiliary drum 20 and the lower auxiliary drum 30 may have the same size. The vanes 11 of the main drum 10 may number more than the vanes 21 of the upper auxiliary drum 20 and the vanes 31 of the lower auxiliary drum 30. The main drum 10, the upper auxiliary drum 20, and the lower auxiliary drum 30 may generate air flow therearound while rotating.

The main drum 10 and the lower auxiliary drum 30 may rotate in the same direction, but the upper auxiliary drum 20 may rotate in an opposite direction. Accordingly, a vortex area 90 in which vortex is generated by the vanes 11, 21, and 31 may be formed between the main drum 10, the upper auxiliary drum 20, and the lower auxiliary drum 30.

Here, because the main drum 10 and the upper auxiliary drum 20 rotate in opposite directions, waste introduced from above may be supplied into a space between the main drum 10 and the upper auxiliary drum 20 and may stay in the vortex area 90 due to revolution of each of the drums 10, 20, 30. Meanwhile, impurities on the waste may be separated and dropped while the waste collides and overturns due to the vanes 11, 21, and 31 and the separation plates 12, 22, and 32 of the drums 10, 20, and 30.

The main drum 10 may rotate slower than the upper auxiliary drum 20, and the lower auxiliary drum 30 may rotate faster than the upper auxiliary drum 20, thereby maximizing vortex. Accordingly, the main drum 10 may perform a function of drawing down introduced waste as well as a function of supporting the introduced waste. In contrast, the upper auxiliary drum 20 may perform a function of shaking off and separating impurities, such as soil or dust, on the waste by hitting the waste supported by the main drum 10. In this case, a bag or a sack is overturned and torn apart, and thus impurities hidden therein may be exposed to the outside and be easily removed. The lower auxiliary drum 30 may horizontally reciprocate toward the main drum 10. That is, a horizontally long hole may be formed in a lateral surface of the introduction port 1, and a rotary shaft of the lower auxiliary drum 30 may reciprocate along the long hole. Thus, as the vortex area 90 continuously varies with the position of the lower auxiliary drum 30, vortex may be irregularly created and may overturn the introduced waste in various directions. The lower auxiliary drum 30 may perform a function of hitting waste to remove impurities as well as a function of creating a vortex. A plurality of holes 34 may be formed through the vane 31 of the lower auxiliary drum 30, and thus impurities may be easily discharged through the holes 34 when the waste is hit.

The separation plates 12, 22, 32 of the drum 10, 20, and 30 may include a plurality of protrusions 13, 23, 33 of a trapezoidal shape protruding from respective edges thereof. Corners of the protrusions 13, 23, 33 may be processed into a round shape R and may prevent waste such as string from being dragged by the separation plate and from being wound therearound. In addition, pointed blades N may be formed at distal ends of the separation plates 12, 22, and 32 to perform a function of hitting and cutting the introduced waste.

A fixed cutter 40 may be horizontally disposed on an inner wall of the introduction port 1, and a rotary cutter 50 positioned close to the fixed cutter 40 may be disposed on the vane 11 of the main drum 10.

The fixed cutter 41 may be formed in a shape of a square block and may include protrusions 41 protruding from opposite surfaces thereof. A base 43 on which the fixed cutter 40 is closely disposed may be provided on the inner wall of the introduction port 1, and a plurality of slide grooves 44 into which the protrusions 41 of the fixed cutter 40 are slidably fitted may be continuously formed in a lateral direction.

Long holes 42 may be perpendicularly formed through the center and opposite sides of the fixed cutter 40. Here, the long holes 42 may be formed in parallel to a longitudinal direction of the protrusions 41. Bolt holes 45 corresponding to the long holes 42 of the fixed cutter 40 may be formed in the base 43, and thus the fixed cutter 40 may be fixed to the base 43 by bolts B.

Thus, as the protrusions 41 are seated in the slide grooves 44 of the base 43, the fixed cutter 40 may be stably fixed without shaking to the left and right and are allowed to slide back and forth. Accordingly, impact on the fixed cutter 10 may be transmitted to the protrusions 41 and the slide grooves 44 rather than to the bolts B for fixing the fixed cutter 40, thereby preventing the bolts B from being damaged.

The base 43 may include fastening bolts 46 for moving the fixed cutter 40 forward by pressing a rear surface of the fixed cutter 10. According to this structure, when the fixed cutter 40 is damaged due to long-term use, the fixed cutter 40 may rotate and move the fastening bolts 46 forward. Accordingly, the fixed cutter 40 may be moved forward to maintain a constant interval between the fixed cutter 40 and the rotary cutter 50.

When the function of the fixed cutter 40 is degraded due to wear of the fixed cutter 40, four edges of the fixed cutter 40 may be alternately used by overturning the fixed cutter 40 laterally or vertically and re-fixing the fixed cutter 40, thereby advantageously extending the lifespan of the fixed cutter 40.

The rotary cutter 50 may be formed in the shape of a square block and may be disposed on the vane 11 of the main drum 10 to slightly protrude from the distal end of the vane 11. Here, the vane 11 may include a plurality of accommodation grooves 13 formed therein, and the rotary cutter 50 may be fixed by bolts while partially inserted into the accommodation grooves 13. The rotary cutter 50 may be partially inserted into and fixed to the accommodation grooves 13 in a press-fitting manner and may be firmly and immovably fixed, and impact on the waste may not be transmitted to the bolts. Thereby, the bolts may be prevented from being damaged.

When a function of the rotary cutter 50 is degraded due to wear of the rotary cutter 50, two edges of the rotary cutter 50 may be alternately used by laterally overturning the rotary cutter 50 and re-fixing the rotary cutter 50. Accordingly, the rotary cutter 50 may be used for a long time.

Accordingly, when impurities such as relatively tough string or a band formed of vinyl are likely to be wound around the main drum 10, the impurities may be cut by the fixed cutter 40 and the rotary cutter 50. Thereby, the impurities may be prevented from being wound around the main drum 10.

The screen conveyer 60 may be disposed below the introduction port 1 to be inclined, and a screen 61 may be formed in the shape of a net having numerous meshes formed to allow small particles to pass therethrough. Accordingly, impurities, such as soil, dust, or sand, separated from the introduction port 1 may pass through the screen 61, and may be dropped down and be separately collected.

In contrast, a high-specific gravity material including a PET bottle, a glass bottle, or a can may roll along a slope of the screen 61 and be collected together, and a low-specific gravity material such as vinyl or paper may move along the screen, and may then be dropped at an end thereof and collected together.

A plurality of air nozzles 70 configured to spray air may be disposed below the screen conveyer 60 to face the screen 61.

Air sprayed through the air nozzles 70 may take a pulse form that is instantly, periodically sprayed for a predetermined time. Thus, the low-specific gravity material transported along the screen 61 may be overturned and impurities on the low-specific gravity material may be separated every time air is sprayed.

In this case, the separated impurities may be dropped downwards through the screen 61.

The specific gravity-specific waste air sorter 100 having an impurity separation function using vortex according to the present disclosure, having the aforementioned configuration, may have the following effects.

First, a transport conveyer to which waste is supplied may be disposed above an introduction port and may be driven to supply the waste to the introduction port 1. The waste supplied through the introduction port 1 may include various materials such as a PET bottle, a glass bottle, a can, metals, vinyl, paper, sand, soil, dust, and glass dust.

The waste supplied through the introduction port 1 may be collected at the center and moved downwards by the main drum 10 and the upper auxiliary drum 20 that are rotating. Here, the main drum 10 may rotate at low RPM, the upper auxiliary drum 20 may rotate at medium RPM, and the lower auxiliary drum 30 may rotate at high RPM. Thus, the vanes 11, 21, and 31 included in the respective drums 10, 20, and 30 may generate air flow therearound, and the vortex area 90 in which the maximum vertex is created may be formed between the main drum 10, the upper auxiliary drum 20, and the lower auxiliary drum 30.

As waste positioned in the vortex area 90 stays for a predetermined time using a vortex, impurities on the waste may be separated and may be dropped downwards as it is hit by the main drum 10, the upper auxiliary drum 20, and the lower auxiliary drum 30. Here, because the main drum 10 rotates at low RPM, the main drum 10 may perform a function of supporting waste in contact with the vane 11, and the vane 21 of the upper auxiliary drum 20 that rotates at medium RPM may hit the waste by performing a function of forcibly pressing and hitting the waste. During the procedure, by completely overturning and tearing a bag or a sack, impurities in and outside the bag or sack may be entirely shaken off and separated from the bag or the sack. The protrusions 13, 23, and 33 that protrude around the separation plates 12, 22, and 32 may include the blades N to cut waste such as the torn bag or sack once more.

The vortex area 90 may be repeatedly moved while the lower auxiliary drum 30 reciprocates in a horizontal direction. Thus, the waste may be evenly overturned, and impurities on the waste may be effectively shaken off and separated.

In particular, waste in the form of string is likely to be wound around the main drum 10. Such waste is dragged in close contact with the vane of the main drum 10 and may be cut by the rotary cutter 50 included in the vane 11 and the fixed cutter 40 disposed on the inner wall of the introduction port 1. That is, at the moment when the rotary cutter 50 is positioned close to the fixed cutter 40, the waste such as string wound around the rotary cutter 50 may be cut so as not to be wound around the main drum 10.

As the waste from which impurities have been separated is drawn down by the main drum 10, the waste may be dropped down the introduction port 1, and the impurities separated from the waste may also be dropped down the introduction port 1.

The dropped waste may be dropped to the screen conveyer 60 disposed below the introduction port 1, and as the screen conveyer 60 is disposed to be inclined, a high-specific gravity material and a medium-specific gravity material such as a PET bottle, a glass bottle, a can, or metals may roll to a lower side of the screen conveyer 60 and may be collected together due to the load of the materials themselves, and a low-specific gravity material such as vinyl or paper may be transported along a screen while being put on the screen 61. Impurities with small particles, such as sand, soil, dust, and glass dust, may be collected below the screen conveyer through meshes of the screen 61.

A low-specific gravity material, such as vinyl or paper, transported along the screen 61 may be transported by repeatedly performing a procedure of floating and overturning the low-specific gravity material by air having the pulse form that is instantly sprayed by the air nozzle 70 disposed below the screen 61 with a period for a predetermined time. During this procedure, impurities put on the low-specific gravity material may be separated once more by being repeatedly overturned, and thus may pass through meshes of the screen 61 and may be dropped downwards. Thus, the low-specific gravity material may be collected in a clean state without dust.

During this procedure, three types, that is, a high-specific gravity material, a low-specific gravity material, and impurities may be sorted, and the waste may be sorted while the impurities are effectively removed and separated.

INDUSTRIAL AVAILABILITY

Waste may be sorted by weight while impurities on the corresponding waste are shaken off and separated from the waste by hitting the waste by drums and vanes that rotate while being overturned by a vortex, which may maximize the efficiency of a procedure of sorting waste by specific gravity using an impurity separation function and may be used in various ways in various industrial fields related to waste sorting technology based on maximized efficiency.

The invention claimed is:
1. A specific gravity-specific waste air sorter having an impurity separation function using a vortex, comprising:
a main drum,
an upper auxiliary drum, and
a lower auxiliary drum,
wherein
each of the main drum, the upper auxiliary drum and the lower auxiliary drum includes radial vanes disposed in parallel to an axial direction to generate air flow;
the main drum is disposed at one side of an introduction port, the upper auxiliary drum is disposed at an opposite side of the introduction port, and the lower auxiliary drum is disposed below the upper auxiliary drum;
the main drum and the lower auxiliary drum rotate in the same direction, and the upper auxiliary drum rotates in an opposite direction,
wherein the main drum, the upper auxiliary drum, and the lower auxiliary drum rotate at different speeds to maximize the vortex created between the main drum, the upper auxiliary drum, and the lower auxiliary drum; and
a screen conveyer formed like a net is disposed below the introduction port to be inclined.
2. The specific gravity-specific waste air sorter of claim 1, wherein the lower auxiliary drum horizontally reciprocate toward the main drum to continuously move a vortex area within a predetermined section.
3. The specific gravity-specific waste air sorter of claim 1, further comprising:
a plurality of air nozzles disposed below the screen conveyer such that air that takes a pulse form and is instantly, periodically sprayed for a predetermined time is discharged upwards, and a low-specific gravity material transported along the screen conveyer is continuously overturned and transported to separate impurities once more.
4. The specific gravity-specific waste air sorter of claim 1, wherein the vane of the lower auxiliary drum is provided with a plurality of holes formed therethrough.
5. The specific gravity-specific waste air sorter of claim 1, further comprising:
a fixed cutter disposed on an inner wall of the introduction port; and
a rotary cutter disposed on the vane of the main drum and configured to closely approach the fixed cutter to cut a string when the string is likely to be wound around the main drum.
6. The specific gravity-specific waste air sorter of claim 1, wherein:
each of the main drum, the upper auxiliary drum, and the lower auxiliary drum is provided with a plurality of separation plates arranged in a lateral direction;
each of the separation plates includes a plurality of protrusions formed in a trapezoidal shape on a circumference thereof; and
the protrusions are processed into a round shape and provided with a blade by sharpening distal ends thereof.
7. The specific gravity-specific waste air sorter of claim 2, wherein the vane of the lower auxiliary drum is provided with a plurality of holes formed therethrough.
8. The specific gravity-specific waste air sorter of claim 2, further comprising:
a fixed cutter disposed on an inner wall of the introduction port; and
a rotary cutter disposed on the vane of the main drum and configured to closely approach the fixed cutter to cut a string when the string is likely to be wound around the main drum.
9. The specific gravity-specific waste air sorter of claim 2, wherein:
each of the main drum, the upper auxiliary drum, and the lower auxiliary drum is provided with a plurality of separation plates arranged in a lateral direction;
each of the separation plates includes a plurality of protrusions formed in a trapezoidal shape on a circumference thereof; and
the protrusions are processed into a round shape and provided with a blade by sharpening distal ends thereof.

10. The specific gravity-specific waste air sorter of claim 3, wherein the vane of the lower auxiliary drum is provided with a plurality of holes formed therethrough.

11. The specific gravity-specific waste air sorter of claim 3, further comprising:
   a fixed cutter disposed on an inner wall of the introduction port; and
   a rotary cutter disposed on the vane of the main drum and configured to closely approach the fixed cutter to cut a string when the string is likely to be wound around the main drum.

12. The specific gravity-specific waste air sorter of claim 3, wherein:
   each of the main drum, the upper auxiliary drum, and the lower auxiliary drum is provided with a plurality of separation plates arranged in a lateral direction;
   each of the separation plates includes a plurality of protrusions formed in a trapezoidal shape on a circumference thereof; and
   the protrusions are processed into a round shape and provided with a blade by sharpening distal ends thereof.

\* \* \* \* \*